Jan. 30, 1968  H. GOLDSMITH  3,366,246
ULTRAFILTRATION APPARATUS
Filed Sept. 1, 1965  2 Sheets-Sheet 1

Jan. 30, 1968    H. GOLDSMITH    3,366,246
ULTRAFILTRATION APPARATUS
Filed Sept. 1, 1965    2 Sheets-Sheet 2

United States Patent Office 3,366,246
Patented Jan. 30, 1968

3,366,246
ULTRAFILTRATION APPARATUS
Herbert Goldsmith, Rockville, Md., assignor to National Instrument Laboratories, Inc., Rockville, Md., a corporation of Maryland
Filed Sept. 1, 1965, Ser. No. 484,165
8 Claims. (Cl. 210—436)

ABSTRACT OF THE DISCLOSURE

An ultrafiltration apparatus employing a normally slack tubular semi-permeable membrane inside a porous sintered powder tube with an impervious filtrate collecting cylinder concentric of the sintered powder tube and end plate structure and terminal fitting of facile assembly—disassembly construction permitting application of high fluid pressures to the membrane.

---

The present invention relates to an apparatus adapted for high pressure ultrafiltration.

Ultafiltration is a dialysis technique wherein solutions containing high molecular weight components are concentrated with regard to such high molecular weight components by diffusing the lower molecular weight ingredients from the solution through a semi-permeable membrane. A substantial pressure difference across the membrane is required for flow.

In ultrafiltration the rate of material transport through the semi-permeable membrane is directly proportional to the pressure differential across the membrane. By contrast the material transport rate in the usual dialysis is based on the differences in concentration of diffusible material on the two faces of the membrane.

For ultrafiltration there are are substantial advantages to providing the maximum pressure possible difference across the membrane. However, actual attainment of high pressure differentials is difficult since structural characteristics of the membrane and of its housing sharply limit the pressure drop across the membrane. In addition elastic deformation of the membrane under the various stresses induced by pressure affects pore size which makes for a poorly defined separation.

A principal object of the present invention is to provide a high pressure ultrafiltration apparatus.

A further object of the invention is to provide an apparatus for rapid ultrafiltration.

Still another object of the present invention is to provide an apparatus capable of sharply defined separations by ultrafiltration techniques.

Additional objects and the advantages of the present invention will be apparent from the description which follows.

Figure 1:
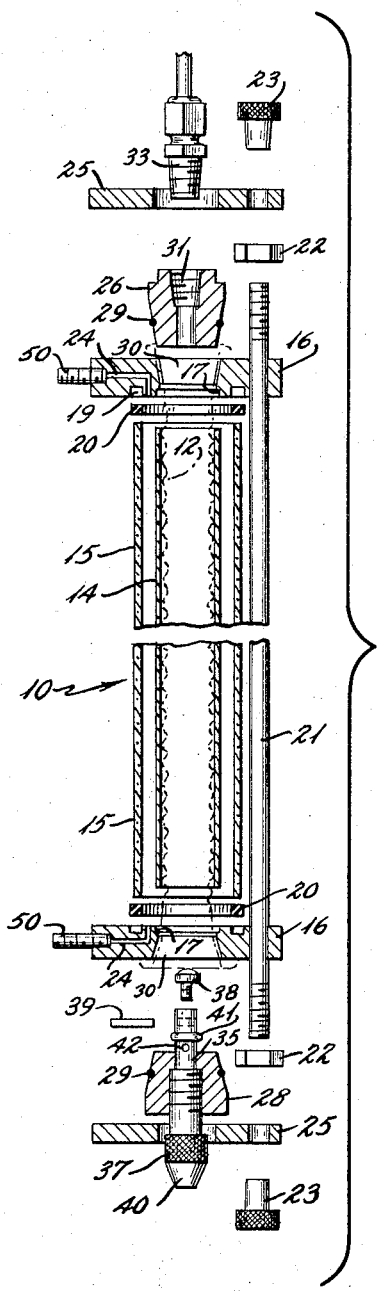

For a more complete understanding of the present invention, reference is now made to the attached drawing illustrating a preferred embodiment thereof, in which:

FIG. 1 is an exploded vertical cross-sectional view of the apparatus; and

Figure 2:
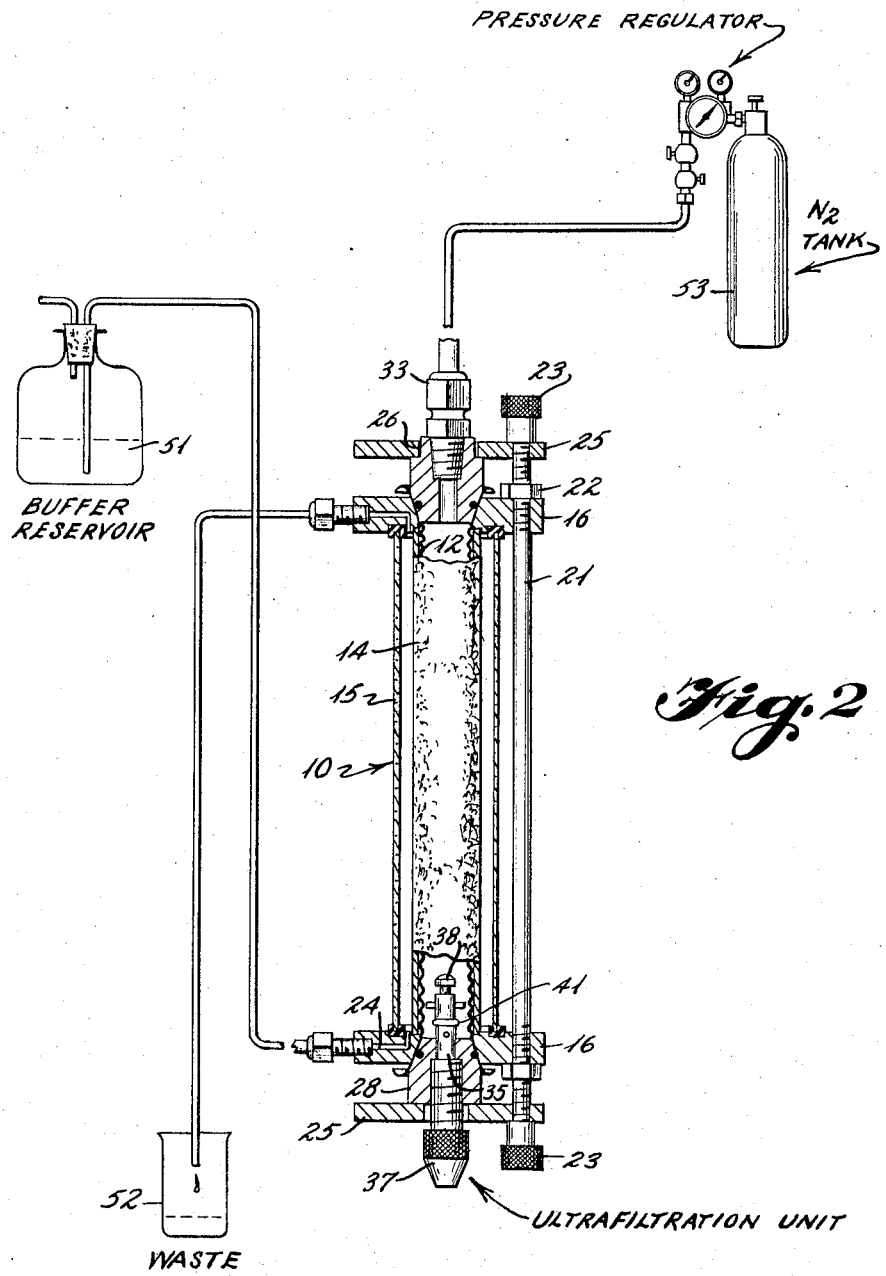

FIG. 2 diagrammatically illustrates a complete assembly of the apparatus with associated equipment.

Referring now to the drawing, it may be seen that the ultrafiltration apparatus 10 comprises a porous tube 14 inside of which is positioned a tubular semi-permeable membrane 12 in a slack state. Exteriorly of porous tube 14 and suitably spaced apart therefrom in ultrafiltration unit 10 is an impervious (glass) cylinder 15.

At both ends of porous tube 14 is a support plate 16 which serves to support and mount porous tube 14 and cylinder 15. Tube 14 seats on a central annular shoulder 17 while cylinder 15 seats in circular recess 19 on a gasket 20. As is shown on FIG. 2 of the drawing, plates 16 are clamped into compression engagement with porous tube 14 and cylinder 15 by a plurality (e.g., 3) of peripherally disposed tension rods 21 screw threaded at both ends. Nuts 22 threaded to tension rod 21 at each end thereof secure the rods to support plates 16. Advantageously the same rods 21 are employed with upper and lower clamp plates 25 to secure tapered end plugs 26, 28 which serve to seal off the space inside membrane 12. Thumb nuts 23 threaded on the terminal end portions of rods 21 serve to hold end plugs 26, 28 in position against the elevated pressure internally of membrane 12.

Referring back now to support plate 16, it may be observed that plate 16 contains a passageway 24 which provides access for liquid to enter or leave the annular space between tubes 14 and cylinder 15. A nipple 50 is provided at the end of passage 24 for connection purposes. Plate 16 also has a central bore 30 therein in the form of a conic section flaring outwardly away from tube 14 with annular shoulder 17 at the narrow end of bore 30. Plug member 26 or 28 of corresponding tapered conic shape is inserted into the bore 30 of support plate 16 with the open end of semi-permeable membrane 12 therebetween. An O-ring 29 seats on each plug 26 and 28 in a suitable side recess provided therein for this purpose.

The upper end plug 26 has provided therein a threaded central aperture 31 into which fits threaded connector 33. In corresponding fashion the lower end plug 28 contains threaded central aperture 35 into which fits a vent valve 37. Also shown on FIG. 1 of the drawing are the component parts of valve 37, i.e., screw 38, pin 39, knurled end 40 of the valve stem, O-ring 41 and valve port 42. Once vent valve 37 is assembled in plug 28 outward rotation of stem end 40 draws the body of valve 37 down until valve port 42 passes into central aperture 35, then O-ring 41 enters (sealing the opening) until finally stop pin 39 rests against the surface of plug 28 halting further movement.

Preliminary to assembly of the ultrafiltration unit 10 as a whole the vent valve 37 is threaded into lower end plug 28 in an air tight relation and the connector 33 is threaded into upper end plug in an air tight relation. Also the O-rings 29 are placed on the plugs.

For assembly porous tube 14 is mounted on shoulder 17 of plate 16 and outer tube 15 on gasket 20 in annular recess 19 of the support plates 16. Then rods 21 are inserted through support plates 16 and secured thereto by nuts 22.

Thereafter the tubular semi-permeable membrane 12 is inserted in a slack state into porous tube 12, the diameter of tubular membrane 12 being greater, and preferably at least 5% greater than the inner diameter of tube 14. Taking care to avoid creasing membrane 12 the end plugs 26, 28 are eased respectively into the central bore 30 of the upper and lower plate 16 until finally the plugs are seated in end plates 16 with the membrane 12 in a slack state inside porous tube 14. The excess membrane tubing extendings out between plates 16 and plugs 26, 28. The plugs 26, 28 are then secured in place by adding clamp plates 25 and tightening them down with thumb nuts 23.

The assembled ultrafiltration apparatus 10 is then filled with solution through connector 33, with vent valve 37 closed. Ultrafiltration apparatus 10 may then be hooked up by suitable tubing in the manner shown in FIG. 2 to a buffer reservoir 51, a waste container 52 and a pressure source 53, i.e., nitrogen tank.

The arrangement of FIG. 2 is for a batch ultrafiltration of a small quantity of solution. For ultrafiltration of larger quantities a pressure reservoir (not shown) can be interposed between nitrogen tank 53 and connector 33 to feed pressurized liquid into apparatus 10 as ultrafiltration proceeds. Initially the vent may be inverted to bleed out trapped gas therefrom through vent valve 37. Also during operation vent valve 37 can be opened from time to time to recover concentrated liquid and make place for fresh feed.

The conic shape of the central bore 30 in support plate 16 and the matching conic shape of tapered plugs 26, 28 are quite important to the present invention. They serve to maintain an air tight pressure seal, yet allow the ultrafiltration apparatus 10 to be easily assembled and disassembled. As is well known in the art, pressure applied on such conic members causes them, e.g., plug 26 and support plate 16, to seal together. Since plugs 26, 28 and end plates 16 alike are normally non-metallic, i.e., plastic, and therefore have a greater tendency to compressional deformation than the metal of clamp plates 25, tightening clamp plates 25 holds the plugs and support plates in place to an extent which depends on the applied stress. For later disassembly it is, however, equally desirable that the plugs and plates be capable of ready separation. Accordingly it is an important aspect of the present invention that the conic angle employed for the plug and support plates be what is known in the art as a non-locking angle. Since skilled workers in the art are familiar with the concept of locking angles and non-locking angles in ring and hook members, and also are familiar with the relationship of these angles to the coefficient of fraction of the material involved, further explanation of the non-locking angle is not necessary. In any event the maximum non-locking angle which may be employed will vary with the materials of construction and no fixed value thereof can be given. In general the total included angle between plug 26, 28 and plate 16 should exceed about 20°.

An important aspect of the present invention involves the slack state of membrane 12. As has already been indicated the cylindrical semi-permeable membrane which may for example be regenerated cellulose should have an unstretched diameter of at least 5% greater than the internal diameter of porous tube 12. It is most important to the practice of the present invention to avoid stretching of the semi-permeable membrane during insertion or use. Stretching or deflection of the membrane involves expanding the pore size and as a result a poorly defined separation results.

A related facet of the same problem is the relationship between the pore size of the semi-permeable membrane and the pore size of the tube 12. A rigid sintered metal or plastic powder tube of high porosity is desired, i.e., at least 50% porosity. On an absolute basis it is believed that an average pore size for the tube should be in the range of 0.5–250 microns. The reasons for employing a rigid sintered tube can be easily seen when one considers the character of the semi-permeable membrane. Membrane casings are available commercially with controlled pore sizes of 25–40 Angstrom units (0.0025–0.0040 m$\mu$) and an unstretched tube thickness of approximately 0.004″–0.008″. As a material of construction the characteristics of these membranes are poor. Certainly they are rather flaccid in nature and low in tensile strength. Under the pressurized operation of ultrafiltration the membrane is stretched across the surface of pores in the supporting porous tube 14.

Mathematical analysis of the membrane 12 as a structural member shows that the degree of stretching can be substantial when the unsupported span across the pore opening is of any real magnitude. The small pores in sintered powder tube 14 is most advantageous, as is the rigid character of tube 14. Their use allows ultrafiltration apparatus 10 to operate at substantial pressures, e.g., 250 p.s.i. Even a rigid metallic screen, e.g., 200 mesh, has by comparison such large openings that membrane stretching across the openings causes substantial variations in membrane pore size and a less exact separation results. The slack nature of the membrane permits complete conformity against the inner wall of porous tube 14, without any stretch in the membrane tube 12 as a whole. Against the applied internal pressure, the membrane 12 is supported by the porous tube 14 without substantial deflection or stretch at the pore of tube 14 openings because the pore openings are so tiny.

Ultrafiltration units constructed according to the foregoing description of a preferred embodiment thereof with Delrin end plugs 26, 28, and nylon for plates 16, 25, connector 33 and the various parts of valve 37 have been operated routinely at pressures as high as 250 p.s.i. on regenerated cellulose casing for the semi-permeable membrane 12. A preferred porous tube is sintered stainless steel (10–60 micron pore size).

It will be obvious to those skilled in the art that various changes may be made without departing from the spirit of the invention and therefore the invention is not limited to what is shown in the drawings and described in the specification but only as indicated in the appended claims.

What is claimed is:

1. An ultrafiltration apparatus comprising: a tubular semi-permeable membrane; a porous rigid support tube surrounding said membrane, said tube being sintered powder having a porosity in excess of 50% and; said membrane being in a slack state in the absence of internal pressure, the membrane diameter being at least 5% larger than the inner diameter of the porous support tube; an end plug at each end of said supporting tube to seal off the membrane ends pressure tight; means associated with one end plug to apply fluid pressure internally of said tubular membrane; and vent valve means associated with the other end plug for venting the inside of said tubular membrane.

2. An ultrafiltration apparatus as in claim 1 wherein an impervious cylinder surrounds the porous support tube in spaced apart concentric relation thereto providing a filtrate collecting region therebetween.

3. An ultrafiltration apparatus as in claim 2 wherein the terminal edges of the cylinder and of the porous tube are seated concentrically in a pair of support plates, the support plates being secured together by a plurality of tension rods disposed externally of the tubes; the support plates having a central bore into which the end plugs seat.

4. An ultrafiltration apparatus as in claim 3 wherein the end plugs and the central bores of the support plates are tapered, the conical angle of taper being a non-locking angle.

5. An apparatus as in claim 3 wherein each plug is pressed into engagement with its associated support plate by a clamp plate, the clamp plates being secured and stressed by the tension rods.

6. An apparatus as in claim 3 wherein at least one support plate has a passageway therein from the space between the porous tube and the impervious cylinder for removing filtrate from the apparatus.

7. An apparatus as in claim 1 wherein each end plug has associated therewith a support plate into which the porous tube seats; each support plate having a tapered central bore; each end plug being tapered accordingly, the conical angle of taper being a non-locking angle; and wherein each terminal end of the tubular semi-permeable membrane is disposed between an end plug and the support plate associated therewith, being there sealed pressure tight.

8. An apparatus as in claim 7 wherein each end plug is pressed into engagement with its associated support plate by a clamp plate, the support plates and clamp plates being secured and stressed by a plurality of tension rods disposed exteriorly of the porous tube.

References Cited

UNITED STATES PATENTS

| | | | |
|---|---|---|---|
| 1,840,079 | 1/1932 | Bradley | 210—452 X |
| 2,187,514 | 1/1940 | Gardner | 210—445 X |
| 2,502,614 | 4/1950 | Zender | 210—321 X |
| 2,571,210 | 10/1951 | Craver | 210—22 X |
| 2,598,818 | 6/1952 | Muirhead | 210—450 X |
| 2,609,059 | 9/1952 | Benedict | 55—16 |
| 2,650,709 | 9/1953 | Rosenak et al. | 210—453 X |
| 2,824,620 | 2/1958 | DeRosset | 55—16 |
| 3,246,764 | 4/1966 | McCormack | 55—158 X |

FOREIGN PATENTS 309,913  12/1955  Switzerland.

REUBEN FRIEDMAN, *Primary Examiner.*

W. S. BRADBURY, *Assistant Examiner.*